March 22, 1966 R. R. DUPLER Re. 25,987

GAS-FUELED FIREPLACE LOG

Original Filed Feb. 16, 1959 2 Sheets-Sheet 1

INVENTOR.
RAYMOND R. DUPLER
BY Malcolm W. Fraser
ATTORNEY

GAS-FUELED FIREPLACE LOG

Original Filed Feb. 16, 1959 2 Sheets-Sheet 2

INVENTOR.
RAYMOND R. DUPLER
BY Malcolm W. Fraser
ATTORNEY

United States Patent Office

Re. 25,987
Reissued Mar. 22, 1966

25,987

GAS-FUELED FIREPLACE LOG

Raymond R. Dupler, 744 Euclid St., Toledo, Ohio

Original No. 3,113,611, dated Dec. 10, 1963, Ser. No. 793,388, Feb. 16, 1959. Application for reissue Dec. 8, 1964, Ser. No. 431,238
4 Claims. (Cl. 158—100)

Matter enclosed in heavy brackets [ ] appears in the original patent but forms no part of this reissue specification; matter printed in italics indicates the additions made by reissue.

This invention relates to a foraminous casting and method of making same.

The production of a foraminous metal casting has been a difficult and expensive ordeal, particularly when a large quantity of small holes are required. This problem manifests itself for example in making a cast metal fireplace log or the like where a great many of very small holes are necessary for the escape of the air-gas mixture. To drill all of these holes is so expensive as to be virtually prohibitive. It is therefore a desideration to produce a metal casting which can be provided economically with holes of the desired size and appropriately arranged, concomitant with the casting step so that when the casting has cooled, the desired foraminate structure is produced without further work.

Objects of this invention are to produce a new and improved foraminous casting and method of making same which satisfactorily cope with the problem above recited.

Other objects and advantages of the invention will hereinafter appear and for purposes of illustration but not of limitation, an embodiment of the invention is shown in the accompanying drawings in which FIGURE 1 is a front plan view of a fireplace log;

Figure 1:
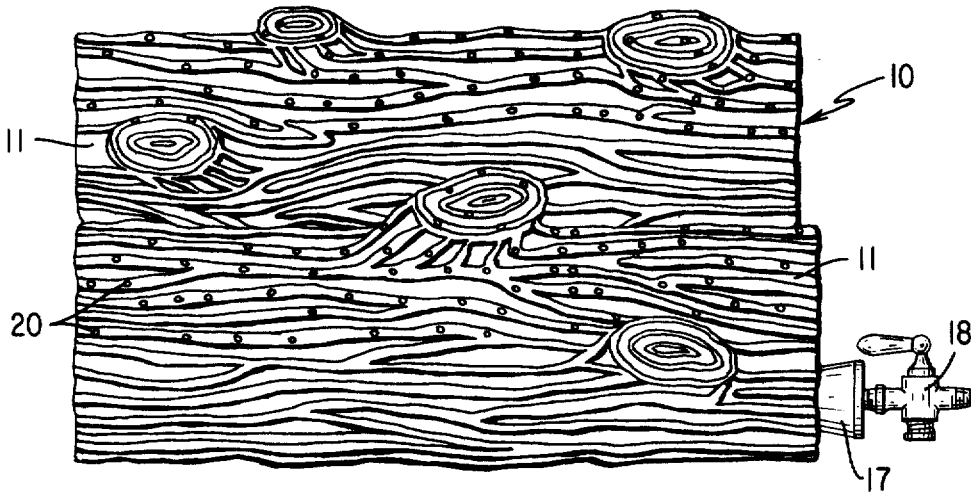
Figure 2:
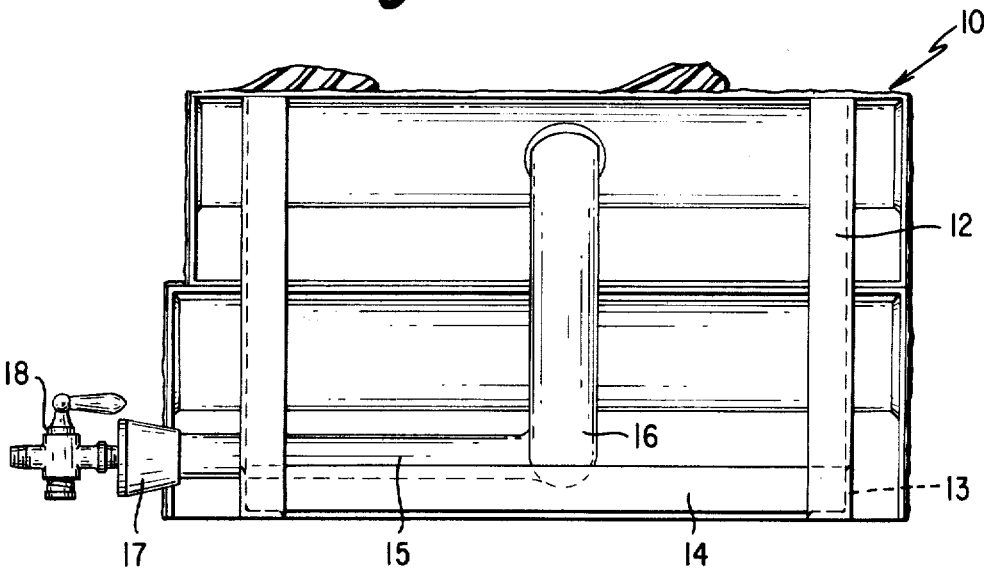
FIGURE 2 is a rear elevation of the fireplace log shown in FIGURE 1.
Figure 3:
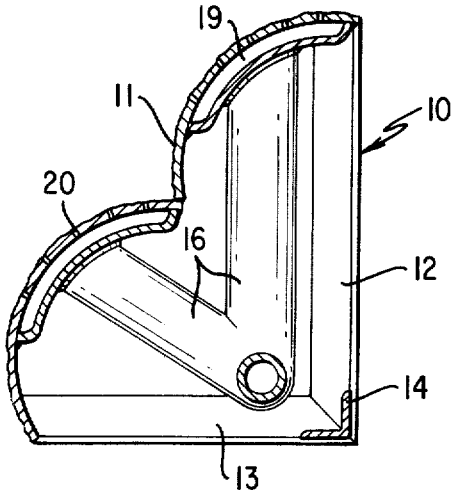
FIGURE 3 is a transverse sectional view of the fireplace log shown in FIGURE 1.
Figure 4:
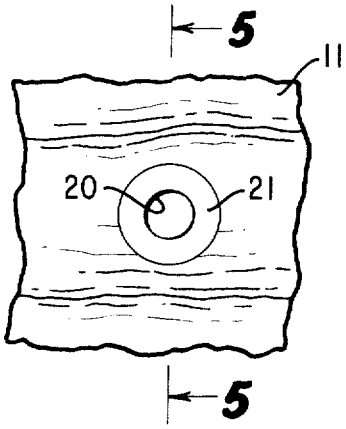
FIGURE 4 is an enlarged fragmentary section of a portion of the face of the fireplace log showing one of the ceramic inserts.
Figure 5:
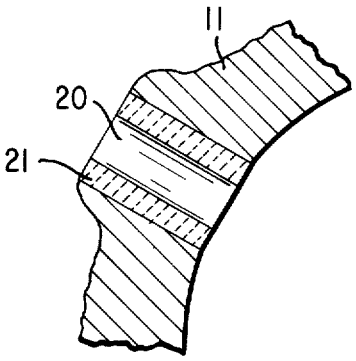
FIGURE 5 is a transverse sectional view substantially on the line 5—5 of FIGURE 4.

The illustrated embodiment of the invention comprises a gas fireplace log structure 10 which for example may be made from a gray iron casting and is shaped at the front to simulate a pair of wooden logs 11 arranged one above the other in stacked formation. As shown in FIGURE 2, the back of the log structure has suitable upright end supporting angle irons 12 and bottom angle irons 13, these being joined by a transverse angle iron 14. Also in the rear and at the lower part of the structure is the horizontally disposed gas admission pipe 15 which has a pair of upwardly extending branch pipes 16. The usual air mixer 17 is disposed between the outer end of the pipe 15 and a regulating valve 18. The branch pipes 16 lead respectively to a pair of horizontally disposed gas plenum chambers 19 directly in rear of the gas emitting surface in the simulated logs. In the front wall of each of the plenum chambers is a large number of small orifices 20 through which the gas-air mixture passes to be ignited.

In accordance with this invention the orifices 20 are formed by a plurality of relatively small ceramic tubes or inserts 21, the rear end of which open into the respective plenum chambers and the front end of which open to the outer surface of the log. The size of the orifices 20 may be varied as desired but for the purpose intended may be of the order of 1/16 of an inch in diameter. The length of the inserts may vary according to the wall thickness of the casting but may be of the order of 1/2 of an inch and the overall diameter of the inserts may be of the order of 3/16 of an inch. Manifestly these dimensions are only approximate and not critical and will depend upon the wall thickness of the casting.

It is necessary that the inserts have sufficient mechanical strength so as not readily to be broken or fractured. However, it is important that the inserts 21 be of a suitable material, such for example as porcelain, having a melting or fusing point substantially in excess of that of the casting. Thus, the inserts are arranged in the desired manner in the mold and the molten metal cast around them. If the melting point of the insert is not sufficiently high, it will melt or fuse and close the passage 20, and thus materially restrict escape of gas and air from the log. Thus, it is necessary to determine the melting point of the metal employed for forming the fireplace structure and then select a material for the inserts which will not adversely be affected by the heat of the molten metal as it is being cast.

From the above it will be apparent that the fireplace log structure can be readily produced to effect the desired porosity quickly and efficiently and at a minimum of expense, thereby avoiding the high expense of individually drilling the holes to effect the desired foraminous structure.

As used in the claims, the expression "ceramic" is to be used in its broadest sense to connote any material which has a fusing temperature sufficiently above that of the cast metal so that the metal may be cast in a mold in which a plurality of the inserts 21 have been previously arranged without melting or distorting them to such an extent as to render them useless for the purpose intended.

Numerous changes in details of construction and choice of materials may be effected without departing from the spirit of the invention especially as defined in the appended claims.

What I claim is:

1. A gas fireplace log and the like comprising a cast metal body, the outer surface of said body simulating the appearance of the surface of a wooden log, a gas plenum chamber disposed within said metal body and adjacent said outer surface, a plurality of orifices arranged in spaced relationship over said outer surface of said body, each of said orifices comprising a short tubular member of relatively higher melting point than said metal body, said tubular member being embedded in said cast metal body during the casting thereof and providing communication between said outer surface and said plenum chamber.

2. The gas fireplace log of claim 1 wherein said tubular member is composed of a ceramic material.

3. The gas fireplace log of claim 1 which also comprises means for supplying a combustible gas to said plenum chamber.

*4. A device of the character described comprising a cast metal body having an outer irregular surface and an inner surface, a plurality of orifices randomly arranged in spaced relationship over said outer surface of said body, each of said orifices comprising a short tubular ceramic member of relatively higher melting point than said metal body, said tubular ceramic member being embedded in said cast metal body during the casting thereof and providing communication between said outer surface and said inner surface.*

(References on following page)

References Cited by the Examiner

The following references, cited by the Examiner, are of record in the patented file of this patent or the original patent.

UNITED STATES PATENTS

| | | | |
|---|---|---|---|
| 126,473 | 5/1872 | Mershon | 158—100 |
| 968,605 | 8/1910 | Ruud | 158—116 |
| 1,604,783 | 10/1926 | Pickup | 158—104 |
| 1,760,586 | 5/1930 | Devers | 22—202 X |
| 1,855,980 | 4/1932 | Merrill | 158—11 |

| | | | |
|---|---|---|---|
| 2,025,331 | 12/1935 | Bullum | 158—11 |
| 2,025,458 | 12/1935 | Klein | 158—69 |
| 2,122,132 | 6/1938 | Docking | 158—99 |
| 2,745,437 | 5/1956 | Comstock | 22—202 X |
| 2,979,792 | 4/1961 | Kauppi | 22—84 X |

FOREIGN PATENTS

| | | |
|---|---|---|
| 81,964 | 7/1895 | Germany. |

FREDERICK L. MATTESON, Jr., *Primary Examiner.*